Aug. 5, 1952     F. W. MEREDITH ET AL     2,605,615
FLUID PRESSURE OPERATED ACTUATOR
Filed May 22, 1951
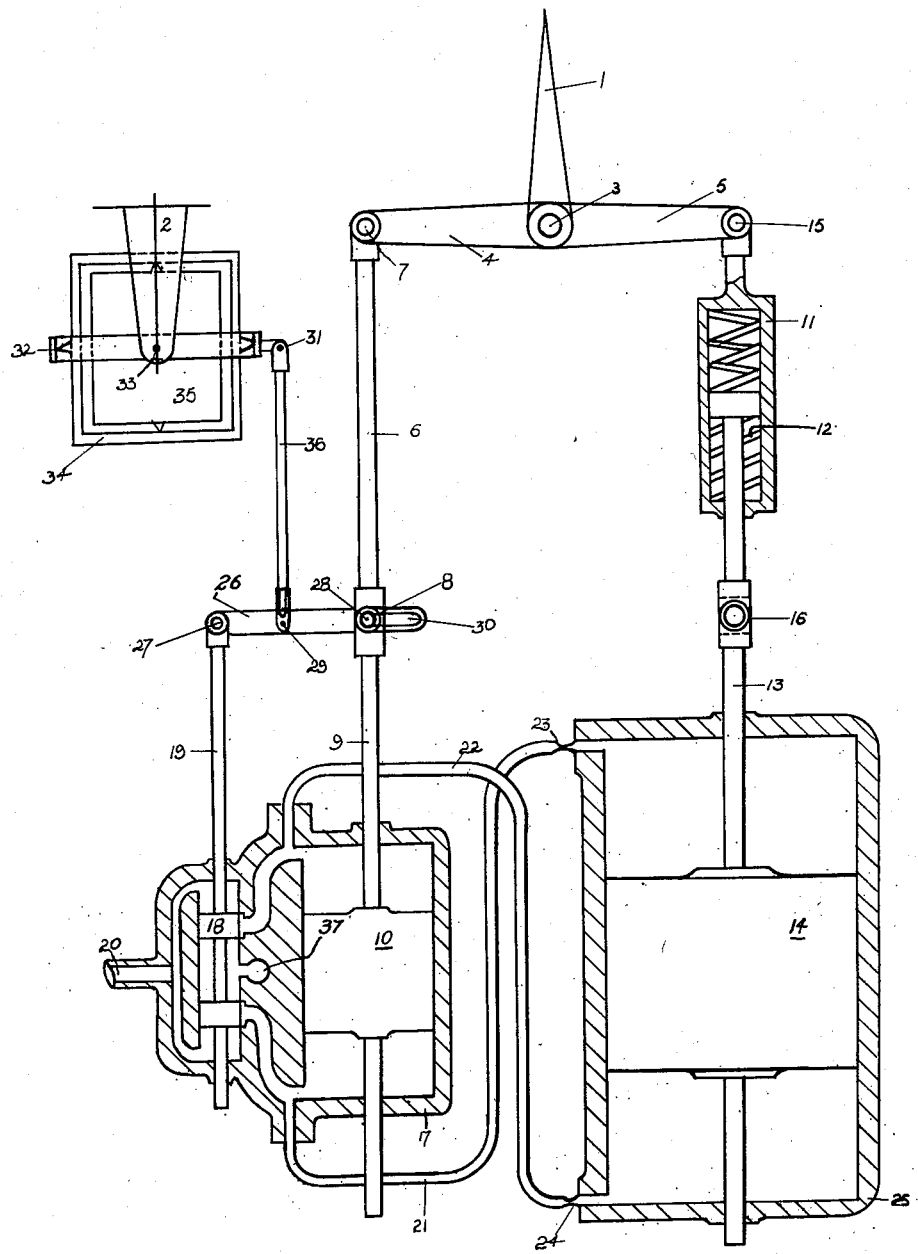
INVENTORS:
F. W. MEREDITH
D. W. RIGHTON
BY: Howard Hall
ATTORNEYS Patented Aug. 5, 1952

2,605,615

UNITED STATES PATENT OFFICE 2,605,615

FLUID PRESSURE OPERATED ACTUATOR

Frederick William Meredith and David William Righton, Cricklewood, London, England, assignors to S. Smith and Sons (England) Limited, London, England Application May 22, 1951, Serial No. 227,566
In Great Britain May 19, 1950

6 Claims. (Cl. 60—97)

This invention relates to fluid pressure operated actuators for control surfaces for dirigible objects.

It is the object of the present invention to provide a novel and simple actuator of the type referred to wherein a main actuator piston and cylinder provide the force acting on the control surface required to meet short period demands and an auxiliary actuator piston and cylinder provide the force required for long period demands.

According to the present invention a fluid-pressure operated actuator for control surfaces for dirigible objects comprises a main actuator cylinder, a piston within said cylinder, said piston acting on a control surface through a substantially rigid connection, an auxiliary cylinder, an auxiliary piston within said cylinder, restricted fluid paths connecting corresponding ends of said main and auxiliary cylinders, together with a connection from said auxiliary piston to said control surface, said auxiliary piston and cylinder and said connection being such that a persistent load on the main piston is relieved by the auxiliary piston.

The connection between the auxiliary piston and the control surface conveniently comprises a resilient link, the stroke of the auxiliary piston being sufficiently great to ensure that the resilient link can be fully compressed or extended when the main piston is near the limits of its travel.

Preferably the cross-section of the auxiliary piston and cylinder is large compared with that of the main piston and cylinder.

The flow of pressure fluid to the main cylinder is most conveniently controlled by a valve and follow-up mechanism of the conventional kind.

It is frequently found that in the control of a dirigible object that the control moments applied thereto can be divided into two classes—short-period low amplitude moments for stabilisation and long-period large amplitude moments for course change. It will be seen that by using an actuator system in accordance with the present invention the short period stabilising moments can be supplied by the main piston and cylinder while the long period large amplitude moments are supplied by the auxiliary piston and cylinder.

A hydraulic actuator for an aircraft elevator, constructed in accordance with the invention, will now be described with reference to the accompanying drawing.

Movement of the elevator, indicated at 1, is controlled by a gyroscope 2 having two precessional degrees of freedom to control the aircraft in pitch.

Elevator 1 is actuated by rotation of a shaft 3 to which it is rigidly attached. There are also attached to the shaft two arms 4 and 5 of equal length. Arm 4 is connected by means of a link 6 to the piston rod 9 of a main actuator piston 10, link 6 being pivoted at 7 to arm 4 and at 8 to piston rod 9. Arm 5 is connected through a spring-containing cylinder 11 and a coil spring 12 carried therein to the piston rod 13 of an auxiliary piston 14, the cylinder 11 and spring 12 effectively forming a resilient link pivoted to arm 5 at 15 and to rod 13 at 16. Spring 12 is such that when compressed through a distance equal to half the stroke of the main piston it exerts a moment equal to the maximum required to be applied to the elevator. Main piston 10 moves in a conventional cylinder 17. Pressure fluid is fed to one side or other of piston 10 from an inlet pipe 20 under the control of a valve 18, fluid from the exhaust side of the cylinder 18 being allowed to flow through outlet pipe 37. The position of valve 18 is controlled by a shaft 19.

Auxiliary piston 14, of considerably greater area than piston 10, moves in a conventional cylinder 25 and has twice the stroke of the main piston. One end of cylinder 25 is connected, through a pipe 21 provided with a restrictive orifice 23, to one end of cylinder 17 while the other end is connected through a pipe 22 provided with a restrictive orifice 24 to the other end of cylinder 17. The sense of connection is such that the moments produced by the two pistons about shaft 3 aid each other.

The position of shaft 19, and hence of valve 18, is controlled by means of a floating link 26 one end of which is pivoted to it, as at 27, and normally substantially at right angles to it. The other end of link 26 is provided with a slot 30 egaging with a pin 28 attached to piston rod 9 in the vicinity of its pivot with link 6. Link 26 is pivoted at an intermediate point 29 to one end of a link 36. The other end of link 36 is pivotally connected at 31 to the outer gimbal ring 32 of gyroscope 2. Outer gimbal ring 32 is pivotally mounted, as indicated at 33, relative to the aircraft for rotation about an axis parallel to the aircraft pitch axis. The inner gimbal ring and rotor of the gyroscope are conventionally illustrated at 34 and 35.

When the aircraft is in its datum attitude in pitch, valve 18, piston 10 and piston 14 are in their mid-positions while spring 12 is unstressed.

Upon the occurrence of deviation of the aircraft from its datum pitch attitude the resultant movement of link 36 will open valve 18 and the resultant motion of piston 10, communicated to floating link 26 via pin 28 and slot 30 will tend to close valve 18. It will be seen that if the distance between pivot 27 and pin 28 is "$a$" while that between 29 and pin 28 is "$b$" the resultant displacement of valve 18 is equal to (displacement of piston rod 9) plus $$\frac{a}{b}$$

(displacement of link 36). Fluid will flow into cylinder 17 until the displacement of valve 18 is zero, that is to say until (displacement of piston rod 9) =

$$-\frac{b}{a}$$

(displacement of link 36) or (angle turned through by elevator 1) = $k$ (deviation of aircraft from datum pitch attitude);

$k$ is a constant depending upon the relative dimensions of the component parts of the system. That is to say, the system operates to cause the elevator 1 to be turned through an angle proportional to the deviation to correct the deviation.

It will be seen that if when a demanded movement of the control surface has been made there is a pressure difference across piston 10, pressure fluid will flow through pipes 21 and 22 via orifices 23 and 24 causing movement of the auxiliary piston 14 to compress or extend the resilient link formed by cylinder 11 and spring 12 and apply a corresponding moment to the elevator 1 until, if the demand is stationary, the requisite moment is supplied largely by the auxiliary piston 14.

By appropriate choice of the size of orifices 23 and 24 in relation to the size of the auxiliary cylinder 25 the "time constant" of the auxiliary piston and cylinder can be made small compared with long period demands and large compared with short period demands so that long period demands for course changing will, effectively, be met by the auxiliary piston and cylinder 14 and 25 while short period stabilising demands will be met by the main piston and cylinder 10 and 17.

We claim:

1. A fluid pressure operated actuator for control surfaces for dirigible objects comprising a main actuator cylinder, a piston within said cylinder, said piston acting on a main control surface through a substantially rigid connection, an auxiliary cylinder, an auxiliary piston within said cylinder, restricted fluid paths connecting corresponding ends of said cylinders, together with means for relieving a persistent load on the main piston, said means being actuated by the auxiliary piston.

2. A fluid pressure operated actuator for control surfaces for dirigible objects comprising a main actuator cylinder, a piston within said cylinder, said piston acting on a main control surface through a substantially rigid connection, an auxiliary cylinder, an auxiliary piston within said cylinder, restricted fluid paths connecting corresponding ends of said cylinders together with a resilient connection between said auxiliary piston and said control surface, said auxiliary piston and cylinder and said connection being so dimensioned that a persistent load on the main piston is relieved by the auxiliary piston, the stroke of the auxiliary piston being such that the resilient member can be fully compressed or extended when the main piston is near the limits of its travel.

3. An actuator as claimed in claim 2 wherein the cross-section of the auxiliary piston and cylinder is large compared with that of the main piston and cylinder.

4. An actuator as claimed in claim 3 wherein the resilient link is fully compressed or extended when the auxiliary piston is exerting a control moment on the control surface substantially equal to the maximum required to be exerted thereon.

5. An actuator as claimed in claim 4 comprising also a valve and follow-up mechanism to control the flow of pressure fluid to the main cylinder.

6. A fluid pressure operated actuator for control surfaces for dirigible objects comprising a main actuator cylinder, a piston within said cylinder, said piston acting on a main control surface through a substantially rigid connection, an auxiliary cylinder, an auxiliary piston within said cylinder, said auxiliary piston and cylinder having a large cross-section compared with that of the main piston and cylinder, restricted fluid paths connecting corresponding ends of said main and auxiliary cylinders, together with means adapted to relieve a persistent load on the main piston, said means being actuated by the auxiliary piston.

FREDERICK WILLIAM MEREDITH.
DAVID WILLIAM RIGHTON.

No references cited.